US009796857B2

(12) United States Patent
Sjong

(10) Patent No.: US 9,796,857 B2
(45) Date of Patent: Oct. 24, 2017

(54) SELF-HEALING COATINGS FROM RECYCLED POLYMER BLENDS

(71) Applicant: EMPIRE TECHNOLOGY DEVELOPMENT LLC, Wilmington, DE (US)

(72) Inventor: Angele Sjong, Louisville, CO (US)

(73) Assignee: Empire Technology Development LLC, Wilmington, DE (US)

( * ) Notice: Subject to any disclaimer, the term of this patent is extended or adjusted under 35 U.S.C. 154(b) by 18 days.

(21) Appl. No.: 14/654,335

(22) PCT Filed: Sep. 25, 2013

(86) PCT No.: PCT/US2013/061613
§ 371 (c)(1),
(2) Date: Jun. 19, 2015

(87) PCT Pub. No.: WO2014/099070
PCT Pub. Date: Jun. 26, 2014

(65) Prior Publication Data
US 2015/0344700 A1  Dec. 3, 2015

Related U.S. Application Data

(60) Provisional application No. 61/739,352, filed on Dec. 19, 2012.

(51) Int. Cl.
*C09D 5/08* (2006.01)
*C09D 123/12* (2006.01)
(Continued)

(52) U.S. Cl.
CPC .............. *C09D 5/08* (2013.01); *B05D 7/14* (2013.01); *C08J 3/20* (2013.01); *C08J 11/04* (2013.01);
(Continued)

(58) Field of Classification Search
None
See application file for complete search history.

(56) References Cited

U.S. PATENT DOCUMENTS 7,022,179 B1    4/2006  Dry
2008/0001116 A1  1/2008  Fredrickson et al.
(Continued)

FOREIGN PATENT DOCUMENTS

WO   WO 2012/009128 A2   1/2012
WO   WO 2012/109028 A1   8/2012
WO   WO 2014/099070 A1   6/2014

OTHER PUBLICATIONS

Brogan et. al., Development of recycled polymer blends for thermal spray applications, US Army Corps of Engineers (Dec. 1997), pp. 76.
(Continued)

*Primary Examiner* — Robert C Boyle
(74) *Attorney, Agent, or Firm* — Pepper Hamilton LLP

(57) ABSTRACT

The present disclosure pertains to coatings with self-repairing capabilities. In some embodiments, the coatings may include a polymer blend, made up of at least two polymers. The coatings may further contain compatibilizers that are nanocontainer particles. The nanocontainers may be filled with self-healing agents. The self-healing agents may be agents that heal cracks formed in the coating or they may be anti-corrosion agents that reduce the corrosion of the underlying metal substrate.

15 Claims, 1 Drawing Sheet

(51) Int. Cl.

| | |
|---|---|
| C09D 167/02 | (2006.01) |
| B05D 7/14 | (2006.01) |
| C08K 9/08 | (2006.01) |
| C09D 5/00 | (2006.01) |
| C09D 7/12 | (2006.01) |
| C08J 3/20 | (2006.01) |
| C08J 11/04 | (2006.01) |
| C08K 9/10 | (2006.01) |

(52) U.S. Cl.
CPC .................. *C08K 9/08* (2013.01); *C09D 5/00* (2013.01); *C09D 7/1266* (2013.01); *C09D 7/1275* (2013.01); *C09D 123/12* (2013.01); *C09D 167/02* (2013.01); *C08J 2300/30* (2013.01); *C08K 9/10* (2013.01); *C08K 2201/011* (2013.01); *Y02P 20/143* (2015.11); *Y02P 20/582* (2015.11); *Y02W 30/70* (2015.05)

(56) References Cited

U.S. PATENT DOCUMENTS

| | | | |
|---|---|---|---|
| 2009/0078153 A1* | 3/2009 | Shchukin | B82Y 30/00 106/14.44 |
| 2010/0009093 A1 | 1/2010 | Scott et al. | |
| 2011/0160345 A1* | 6/2011 | Cooper | C08K 3/04 523/466 |

OTHER PUBLICATIONS

Shim et. al., Polymer coatings by rapid expansion of suspensions in supercritical carbon dioxide, Industrial & Engineering Chemistry Research (Aug. 14, 1999), 38(10) pp. 3655-3662.
Nalther et. al., Emulsion polymerization using Janus particles as stabilizers, Angewandte Chemie (Jan. 11, 2008), 47(4) pp. 711-714.
International Search Report and Written Opinion for International Application No. PCT/US2013/061613 mailed on May 30, 2014.
Anderson et al., Robust plasma polymerized-titania/silica Janus microparticles, *Chemistry of Materials* (2010), 22(10); 3529-3264.
A Method to Produce Janus Particles in Large Quantity, UIC, Office of Technology Management, accessed at https://web.archive.org/web/20100815120843/http://www.otm.illinois.edu/technologies/method-produce-janus-particles-large-quantity, Aug. 15, 2010, p. 1-2.
Branco et al, Combustion-Thermal-Sprayed Recycled Poly(ethylene terephthalate), *Journal of Applied Polymer Science* (2004), 92(5):3159-3166.
Cho et al., Self-healing polymer coatings, *Adv. Mater.* (2009). 21:645-649.
Duarte et al., Production and characterization of thermally sprayed polyethylene terephthalate coatings, *Surface and Coatings Technology* (Apr. 22, 2004), 182(2-3):261-267.
Ferreira et al., Self-healing coatings with multi-level protection based on active nanocontainers, 2009 US Army Corrosion Summit, pp. 1-43 (Feb. 2009).
Garcia et al., Self-healing anticorrosive organic coating based on an encapsulated water reactive silyl ester: Synthesis and proof of concept, *Progress in Organic Coatings* (2011), 70(2-3): 142-149.
Li et al., Layer-by-Layer Assembled Janus Microcapsules, 38(19):7876-7879 (Aug. 20, 2005).
Lin et al., Fabrication and characterization of asymmetric Janus and ternary particles, *ACS Applied Materials Interfaces* (Oct. 27, 2010), 2(11):3185-3191.
Liu et al., Preparation of polymeric Janus particles by directional UV-induced reactions, *Langmuir* (Jun. 12, 2009), 25(18):11048-11053.
Lvov et al., Halloysite clay nanotubes for controlled release of protective agents, *ACS Nano* (May 27, 2008), 2(5):814-820.
Shchukin et al., Active anticorrosion coatings with halloysite nanocontainers, *The Journal of Physical Chemistry* (Jan. 9, 2008), 112(4):958-964.
Shchukin et al., Surface-Engineered Nanocontainers for Entrapment of Corrosion Inhibitors, *Advanced Functional Materials* (Jun. 2007), 17(9):1451-1458.
Walther et al., Engineering nanostructured polymer blends with controlled nanoparticle location using Janus particles, *ACS Nanoletters* (Jun. 6, 2008), 2(6):1167-1178.
Wurm, Polymeric Janus particles, *Angewandte Chemie International Edition* (Oct. 26, 2009), 48(45):8412-8421.
Yoshida et al., Smart Nanomaterials, *ACS Nano* (Jun. 24, 2008), 2(6):1101-1107.
Yuan et al., Functionalization of halloysite clay nanotubes by grafting with gamma-aminopropyltriethoxysilane, *The Journal of Physical Chemistry* (Sep. 12, 2008), 112(40): 15742-15751.
Zheludkevich et al., Anticorrosion coatings with self-healing effect based on nanocontainers impregnated with corrosion inhibitor, *Chemistry of Materials* (Jan. 11, 2007), 19(3):402-411.

* cited by examiner

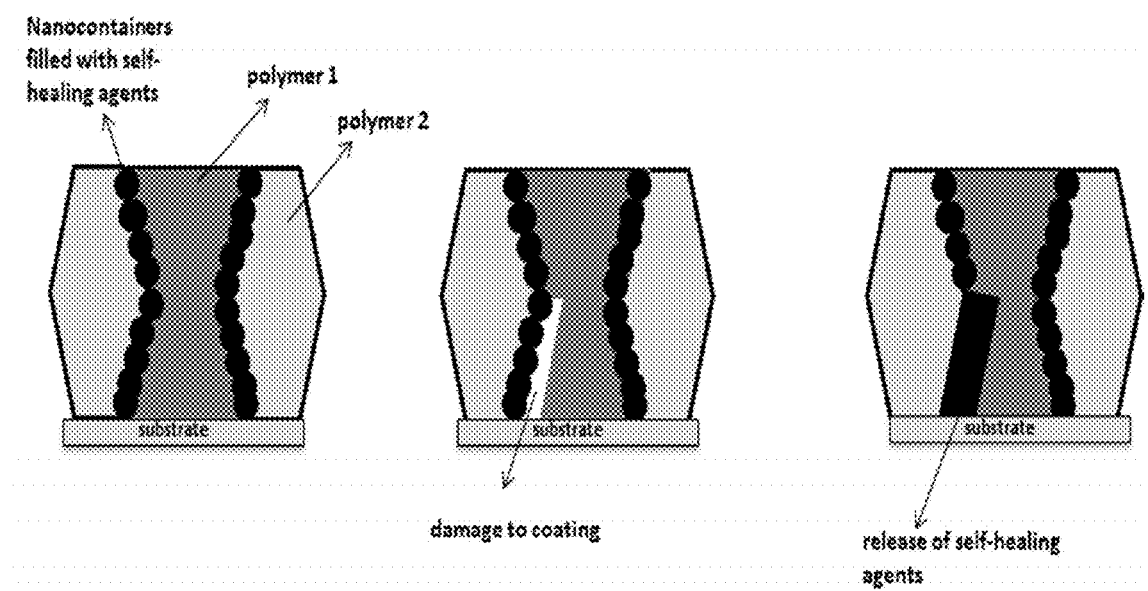

SELF-HEALING COATINGS FROM RECYCLED POLYMER BLENDS

CROSS-REFERENCE TO RELATED APPLICATIONS

The present application is a U.S. national stage filing under 35 U.S.C. §371 of International Application No. PCT/US2013/061613 filed on Sep. 25, 2013 which claims the benefit of and priority to U.S. Provisional Application Ser. No. 61/739,352, entitled "Self-Healing Coatings From Recycled Polymer Blends" filed on Dec. 19, 2012. The aforementioned applications is are incorporated by reference herein in their entireties and for all purposes.

BACKGROUND

The corrosion of metal surfaces is a serious problem, particularly when such metal surfaces are exposed to water, rain, or snow, subjected to conditions of high humidity, or confronted with an atmosphere high in acidic materials. Most metals are susceptible to varying degrees of corrosion that will significantly affect the quality of such metals, as well as that of the products produced from them. Such corrosion problems are of primary importance not only in the ferrous metal field, but also for many of the non-ferrous metals. In addition, when polymer coatings such as paints, adhesives, or rubbers are applied to the metal, corrosion of the base metal material may cause a loss of adhesion between the polymer coating and the base metal.

Polymeric coatings, such as sprayable polymer coatings, have been used as a form of protection against corrosion and wear for metal substrates. With the increase in recycling of post-consumer waste plastics in recent years, plastic containers made from polypropylene, polystyrene, polyvinylchloride, polyethylene terephthalate, etc., have been recycled back into post-consumer commingled plastic coatings, which can have applications in protective coatings for metal substrates. Typically, the recycling may involve melt-compounding the commingled plastics to form a continuous phase. During the process, the commingled plastics can also be blended with other polymers to obtain the desired mechanical properties. A major challenge during this blending process is overcoming the immiscibility of the different polymeric species. Due to differences in surface tension between the different polymeric species in the blend, limited diffusion can occur between incompatible species, thereby weakening the cohesive strength between the immiscible polymer species. A variety of compatibilization methods for commingled plastics have been proposed, mostly based on the addition or generation of block copolymers at the interface between the different polymer species. However, these techniques are typically not cost-effective, since block copolymers are usually made by chemically sophisticated synthetic routes. Current available compatibilizers, such as linear block copolymers, are also deficient in that they result in inadequate cohesive strength at the interface, thereby producing polymer blend coatings that are susceptible to cracking.

Corrosion of the underlying metal substrate may occur due to abrasion of the coating or due to formation of cracks within the coating. A crack in such a coating typically leads to corrosion of the underlying metal, resulting in expensive and wasteful repair or replacement of some or all of the metal substrate. A coating with a self-healing property would self-heal upon its physical compromise. Therefore, self-healing agents may be incorporated into the coating. These agents can fill cracks or inhibit corrosion when the coating is damaged. Thus, it is desirable to develop self-healing coatings from polymer blends, including recycled polymers, that contain corrosion inhibitors or crack-healing agents.

SUMMARY

The current disclosure is directed to coatings with self-healing agents, and these self-healing agents may be crack-healing agents or anti-corrosion agents. In one embodiment, a polymer coating may be a polymer blend of at least a first polymer and a second polymer, and at least one nanocontainer configured to store at least one self-healing agent. Further, the at least one nanocontainer may be at least partially mixed with the polymer blend, and the coating is a self-healing coating.

In another embodiment, a method of inhibiting corrosion of a substrate may include applying a polymer coating on the substrate, wherein the coating may be a polymer blend of at least a first polymer and a second polymer, and at least one nanocontainer configured to store at least one self-healing agent. Further, the at least one nanocontainer may be at least partially mixed with the polymer blend.

In an additional embodiment, a method of preparing a self-healing coating may include: (a) generating at least one Janus nanoparticle containing at least one self-healing agent; and (b) at least partially mixing the Janus nanoparticle with a polymer blend of at least a first polymer and a second polymer.

In a further embodiment, a coated article may be an article and a self-healing coating on the surface of the article. The coating may be a polymer blend of at least a first polymer and a second polymer. Further, the coating may contain at least one nanocontainer configured to store at least one self-healing agent, and the at least one nanocontainer may be at least partially mixed with the polymer blend.

In another embodiment, a method of coating an article may include applying a coating to the article, wherein the coating is a polymer blend of at least a first polymer and a second polymer, and at least one nanocontainer configured to store at least one self-healing agent. Further, the at least one nanocontainer may be at least partially mixed with the polymer blend, and the coating is a self-healing coating.

BRIEF DESCRIPTION OF THE FIGURE

FIG. 1 illustrates the self-healing property of a coating according to an embodiment.

DETAILED DESCRIPTION

This disclosure is not limited to the particular systems, devices and methods described, as these may vary. The terminology used in the description is for the purpose of describing the particular versions or embodiments only, and is not intended to limit the scope.

The term "nanocontainer" refers to structures or particles of size of about 0.1 nanometer to about 500 micrometers in diameter or length, and of any shape.

The term "self-healing" refers to self-recovery of the mechanical integrity and initial properties of a material after destructive actions of an external environment or internal stress. Self-healing may include slowing or inhibiting the corrosive process. Self-healing may also include repairing of cracks within a coating, with the aid of components present in the coating.

Coatings with self-repairing capabilities are disclosed herein. In some embodiments, a coating may include a polymer blend, made up of at least two polymers. The coatings may further include compatibilizers that are nanocontainer particles to improve the mixing of the polymers. In some embodiments, the nanocontainers may be filled with self-healing agents. The self-healing agents may be agents that heal cracks formed in the coating or they may be anti-corrosion agents that reduce corrosion of the underlying metal substrate. The self-healing agents may be a combination of crack-healing and anti-corrosion agents.

In some embodiments, the nanocontainers may be Janus particles. Janus particles are structures or particles that have at least two incompatible sides. For example, one side of the particle may be polar and other side may be nonpolar. Janus particles have been shown to be highly effective in stabilizing polymer blends and overcome problems associated with block copolymer compatibilizers to some extent. It has been shown that these particles preferentially adsorb at interfaces better than standard surfactants or homogeneous particles. For instance, one surface of the Janus particle may be compatible to interact with the first polymer, and the second surface may be compatible to interact with the second polymer, thus helping in the blending of the polymers. In some embodiments, the Janus particles may have opposing hydrophobic and hydrophilic surfaces.

Non-limiting examples of crack-healing agents include silyl esters, polydimethylsiloxanes, methanol, ethanol, ethylphenyl acetate, dicyclopentadiene and dibutyl phthalate. The mode of action of some of the crack-healing agents may be as follows. Upon release, the silyl ester may localize to the damage site, wetting both the metal and polymer surface. The silyl ester may react with water/humidity and metallic substrates to form silanol and oleic acid, thus forming a hydrophobic barrier which protects the metal from further corrosion.

Corrosion inhibitors may be divided into two broad categories, those that enhance the formation of a native protective oxide film through an oxidizing effect, and those that inhibit corrosion by selectively adsorbing on the metal surface and creating a barrier that reduces access of the corrosive agent to the surface. In the former group are materials such as inorganic chromates, inorganic nitrates, molybdates and organic nitrates. The latter group includes materials such as carbonates, silicates and phosphates and organic molecules containing heteroatoms such as nitrogen, sulfur, phosphorus and oxygen (e.g. materials such as anthranilic acid, thiols, organic phosphonates and organic carboxylates). Any of the corrosion inhibitors that are described herein may be used in the coatings. In some embodiments, the corrosion inhibitors may be benzotriazole, 2-mercaptobenzothiazole, polyaniline formaldehyde, 2,3-diphenyl benzoquinoxaline, mebendazole, isoxazolidines, or combination thereof.

It is well known that corrosion activity leads to local changes in pH, due to generation of hydroxyl ions. A change in pH may trigger a release of corrosion inhibitors from nanocontainers. In some embodiments, the nanocontainer may release the self-healing agents when the nanocontainer is exposed to a change in pH. A change in pH may be an increase in pH or a decrease in pH.

In the present disclosure, the polymer compatibilizing nanocontainers may encapsulate the self-healing agents partly or completely. In some embodiments, the self-healing agents may be in contact with the outer surface of the nanocontainer. For example, the self-healing agents may surround a nanocontainer. In some embodiments, there may be non-covalent interactions between self-healing agents and the nanocontainers. Thus, the self-healing agents and the nanocontainers may associate in various ways so as to maintain a local concentration of the self-healing agent in or around the nanocontainer.

In some embodiments, the method may comprise a first-step that includes preparing a nanocontainer loaded with self-healing agents, and a second step that includes modifying the surface of the loaded nanocontainers to obtain nanocontainers with compatibilizing properties or Janus properties (asymmetric surfaces). Nanocontainers that hold the self-healing agents may be prepared by various methods known in the art. Exemplary methods include, making nanocontainers from an oxide nanoparticle, from a titania reservoir, from a silicate particle coated with polyelectrolyte layers, from a halloysite, from a layered double hydroxide composite, from a polyelectrolyte capsule, or from poly(urea-formaldehyde).

In some embodiments, a silicate particle coated with polyelectrolyte layers may be used as a compatibilizing nanocontainer. An exemplary nanocontainer may be a silicon dioxide particle coated with corrosion inhibitor benzotriazole and polyelectrolyte layers. A benzotriazole-loaded polyelectrolyte shell may be formed on the surface of the negatively charged $SiO_2$ nanoparticles using a layer-by-layer deposition approach. For example, a silicon dioxide particle may be successively coated with alternating layers of positively charged and negatively charged polyelectrolytes, and benzotriazole may be introduced during this process such that it is trapped between the layers. Example electrolytes that may be used in the process are sodium polystyrene sulfonate, polydiallyl dimethyl ammonium chloride, polyallylamine hydrochloride and the like.

In some embodiments, the polymer compatibilizing nanocontainers may be halloysites loaded with benzotriazole. Halloysite is a two-layered aluminosilicate and a naturally occurring clay mineral. They generally appear as cylindrical structures, with cylinders have an average diameter of about 10 nanometers to about 150 nanometers, with lengths between 0.5 micrometer and 10 micrometers. An exemplary method to load halloysites with benzotriazoles is by mixing the halloysites in a solution of benzotriazole, and degassing the mixture using a vacuum pump. Air from the interior of the halloysite cylinders is removed and replaced by benzotriazole in this process. The mixture is filtered and excess benzotriazole may be removed by centrifugation. Such nanocontainers described herein may release benzotriazole when exposed to local changes in pH, such as at the site of corrosion.

The surface of the loaded nanocontainers that are described herein may be further modified to obtain "Janus-nanocontainers" or nanocontainers with asymmetric surfaces by any of the known techniques in the art, such as layer-by-layer assembly of polymers, one-sided plasma enhanced chemical vapor deposition or one-sided photopolymerization.

An example layer-by-layer assembly of polymers may be performed by multi-layered coating of polymer layers on a loaded nanocontainer, with alternating layers of polyacrylamide and polyacrylic acid. The multi-layer coated nanocontainer may then be placed on a glass slide and stamped with poly(allylamine hydrochloride) (PAH) that results in transferring PAH to at least one surface of the nanocontainer (surface away from the glass slide) due to electrostatic interactions, thus giving the nanocontainer an asymmetric surface.

Fabricating Janus-type nanocontainers by plasma enhanced chemical vapor deposition method may be performed coating a sacrificial polystyrene (PS) layer on a clean silicon substrate to a desired thickness, which may be more or less equal to the diameter of the nanocontainers. The nanocontainers (loaded with self-healing agents) are then embedded in the PS layer and the exposed surface of the nanocontainers are coated with polymers by plasma polymerization. The PS layer may then be dissolved using toluene resulting in nanocontainers with asymmetric polymer coatings.

In some embodiments, the surface of the loaded nanocontainers may be fabricated to obtain an asymmetric surface by UV-induced photopolymerization. Briefly, loaded nanocontainers may be spin coated onto a surface, such as quartz wafers. The polymer is then grafted onto nanocontainer by spreading a monomer solution along with a photoinitiator on the surface. Upon UV-irradiation, the photoinitiator is excited and abstracts a hydrogen atom from the surface of the nanocontainer particles, leading to formation of radicals on the surface. These radicals readily react with monomer molecules and initiate polymerization, resulting in nanocontainers with asymmetric polymer coatings.

The Janus nanocontainers described herein may be present in a coating composition at about 0.5 weight percent to about 10 weight percent, at about 0.5 weight percent to about 5 weight percent, or at about 0.5 weight percent to about 1 weight percent. Specific examples include about 0.5 weight percent, about 0.7 weight percent, about 1 weight percent, about 2 weight percent, about 5 weight percent, about 10 weight percent, and ranges between any two of these values (including the endpoints).

In some embodiments, the coatings may contain polymer blends obtained from post-consumer commingled plastics. Non-limiting examples of such polymers include polyethylene, polypropylene, polystyrene, polyvinylchloride, polyethylene terephthalate, polyethylene methacrylate, polymethyl methacrylate, or combinations thereof. In some embodiments, the polymer blend may include alkyl methacrylate polymers, allyl methacrylate polymers, thioethyl methacrylate polymers, vinyl methacrylate polymers, vinyl benzene polymers, 2-hydroxyethyl acrylate polymers, butyl acrylate polymers, 2-ethylhexyl acrylate polymers, vinyltrimethoxysilane polymers, vinyltriethoxysilane polymers, vinyltoluene polymers, α-methyl styrene polymers, chlorostyrene polymers, styrenesulfonic acid polymers, or a combination thereof.

The polymer blends may be prepared by melt blending or melt compounding the individual components using any screw type compounding extruder known in the art. Any known melt mixer in the art, such as a single or twin-screw extruder, blender, kneader, internal mixer, or roll mixer may be used in this step. An exemplary process for producing the polymer blends according to the present disclosure may be mixing a first dried granulated polymer, a second dried granulated polymer, and a compatibilizing nanocontainer. The mixture may be melt blended using methods well known in the art. The mixture may be compounded by extrusion with subsequent granulation, if required. Such polymers may be incorporated in paints and coatings.

Paints and coatings may contain one or more additives in their composition. These additives may alter one or more of the properties of the paint, such as shelf life, application, longevity, and health and safety. Such additives may be added, for example, during the manufacture of the emulsion polymer or during the formulation of the paint itself. Additives include, but are not limited to, initiators, rheology modifiers, preservatives, coalescing agents, and the like. Initiators are a source of free radicals to initiate the polymerization process in which monomers condense to form the polymers. Coatings may contain a redox system initiator, such as ferrous and thiosulfate salts along with the persulfate salts, that promote polymerization at room temperature.

Thickeners and rheology modifiers may also be added to coatings to achieve the desired viscosity and flow properties. Thickeners function by, for example, forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions.

One or more preservatives may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride, may be used.

Coalescing agents, such as ester alcohols, benzoate ethers, glycol ethers, glycol ether esters and n-methyl-2-pyrrolidone, may be added to the coating compositions. Coalescing agents are added to, for example, ensure film formation under varying atmospheric conditions. They may be slow evaporating solvents with some solubility in the polymer phase. They may also act as a temporary plasticizer, allowing film formation at temperatures below the system's glass transition temperature. After film formation, the coalescing agents may slowly diffuse to the surface and evaporate, increasing the hardness and block resistance of the film.

Coatings may further contain one or more of the following additives: solvents, pigments, plasticizers, surfactants, and the like. Surfactants may be used, for example, to create the micelles for particle formation, and long-term particle stabilization. Surfactants may provide stability through electrostatic and steric hindrance mechanisms. Both ionic and non-ionic surfactants may be used. Examples may include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene, stearic acid and polyoxypropylene.

One or more plasticizers may be added to the compositions to adjust the tensile properties of the paint film. Plasticizers include, for example, a glucose-based derivative, a glycerine-based derivative, propylene glycol, ethylene glycol, phthalates and the like.

Paints may further include one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings with the ability to obscure a background of contrasting color (hiding power).

A coating of the present disclosure may be a decorative coating, an industrial coating, a protective coating, or any combination thereof. The coating of the present disclosure may generally be applied to any substrate. The substrate may be an article, an object, a vehicle, or a structure. Although no particular limitation is imposed on the substrate to be used in the present disclosure, exemplary substrates include, an exterior of a building, vehicles, bridges, airplanes, metal railings, fences, building materials, windows, electronics, automotive parts, marine parts, aerospace parts and other metal substrates. Suitable metallic substrates include, but are not limited to any of the common structural metals including iron, steel, stainless steel, lead, aluminum, copper, brass, bronze, Monel metal, nickel, titanium and zinc. Suitable metals also include precious metals, such as but not limited to, gold, silver, palladium, rhodium, iridium, osmium, ruthenium, germanium, beryllium, gallium, indium, tellurium and platinum. The coating may be applied to a substrate by spraying, dipping, rolling, brushing, or any combination thereof. Coatings disclosed herein also may be used in the form of primers, paints, stains, sealers and topcoats.

An exemplary coating composition sprayed on a substrate is shown in FIG. 1. The binder of the coating composition is a polymer blend, compatibilized by Janus type nanocontainers. The Janus particles are present at the interface of the polymers. The Janus particles are filled with self-healing agents, and these agents are released when they come in contact with a defect in the coating or an underlying corrosion. The change in pH near the corrosion area may trigger the release of the self-healing agents from the nanocontainers. These self-healing agents may flow into the cracks in the coating and reduce the corrosion process.

EXAMPLES

Example 1: Preparing Halloysite Nanocontainers with Corrosion Inhibitor

About 10 grams of washed, dried halloysite is mixed with 100 mL of 2-mercaptobenzothiazole with constant stirring. The solution is decanted into a vacuum filtering flask and degassed using a vacuum pump for 15 minutes. The halloysite loaded with 2-mercaptobenzothiazole is separated by centrifugation at 10,000 rpm for 10 minutes. The halloysite is washed with water and the 2-mercaptobenzothiazole is reloaded three more times as detailed above.

Example 2: Preparation of Silicate Nanocontainers with Corrosion Inhibitors

About 100 grams of silicon dioxide particles is mixed with a positively charged electrolyte polydiallyldimethylammonium chloride dissolved in 0.4 M NaCl and incubated for 15 minutes. The silicon dioxide particles are separated from the solution by centrifugation at 6,000 rpm for 10 minutes. The silicon dioxide particles are mixed with a negatively charged electrolyte polymethacrylic acid dissolved in 0.4 M NaCl for 15 minutes. The silicon dioxide particles are then separated by centrifugation as detailed above. This is followed by adsorbing silicon dioxide particles with a layer of corrosion inhibitor by mixing the particles in a solution of 2-mercaptobenzothiazole. Further, the silicon dioxide particles are adsorbed again with alternating layers of polydiallyldimethylammonium chloride and polymethacrylic acid as detailed above, to obtain a silicate nanocontainer with a corrosion inhibitor.

Example 3: Fabricating Janus-Nanocontainers by Plasma Enhanced Chemical Vapor Deposition (PECVD)

The polystyrene (PS) is dissolved in toluene at low concentration and spun coated onto a silicon substrate. A spin speed of 1500 rpm at a solution concentration of 10 weight percent is used to fabricate layers from 1.2 to 1.4 µm in thickness. The loaded halloysite nanocontainers (Example 1) are suspended in ethanol to form a dilute solution concentration (about 2 milligrams/mL). A drop of the solution (100 µL) is placed on the PS coated wafer and allowed to dry. After placing the nanocontainers on the PS film, the system is heated to 135° C. for 3 hours and then slowly cooled to room temperature. This process allows the nanocontainers to partially sink into the PS layer. A monomer, such as acrylonitrile is then deposited on the halloysite nanocontainer by plasma enhanced chemical vapor deposition (PECVD). Plasma depositions are carried out in a custom built PECVD chamber, using 13.56 MHz RF plasma in a low pressure argon atmosphere. The liquid acrylonitrile is placed in a sealed tube connected to the reaction chamber and vaporized directly into the plasma stream. After modification of the surface, the nanocontainers are washed with hot toluene (50° C.) and centrifuged, and the supernatant is decanted. The nanocontainers are then sonicated to separate them from aggregation.

Example 4: Preparation of a Paint with Janus Nanocontainers Filled with Corrosion Inhibitors Dry pellets of polypropylene and polyethylene terephthalate are melt blended (weight to weight ratio of 2:1) in the presence of a small amount of coated halloysite filled with 2-mercaptobenzothiazole (Example 3). Melt blending is performed using a twin-type screw extruder (50 rpm) at 140° C. 100 grams of the dried blended polymer is mixed with 40 grams of chromium oxide pigment, 2 grams of thickener (hydroxyethyl cellulose), 150 grams of solvent (water), 0.3 grams of coalescing agent (2,2,4-trimethyl-1,3-pentanediolmono(2-methylpropanoate)), and 0.05 grams of bactericide. The components are mixed under high shear for 30 minutes.

Example 5: Testing Anti-Corrosion Properties of the Coatings

A corrosion test for a metal sheet is carried out using a salt spray test according to ASTM B117-97 test standards. A metal sheet is sprayed with a paint containing the halloysite nanocontainers of Example 4. A similar metal sheet is sprayed with a paint lacking halloysite nanocontainers. The paint is allowed to dry and the coated sheets are scribed with an X through the paint down to the metal. The metal sheets are placed in a salt fog chamber (5% NaCl, 35° C.) for 200 hours. At the end of this period, the metal sheets are visually inspected for corrosion and peeling of the paint at the site of damage. The metal sheet sprayed with paint containing halloysite nanocontainers will display less corrosion and peeling of the paint, when compared to the metal sheet sprayed with a paint lacking halloysite nanocontainers.

Example 6: Testing Anti-Corrosion Properties of the Coatings

A corrosion testing of the metal sheet is carried out using a salt spray test according to ASTM B117-97 test standards. A metal sheet is coated with a paint containing halloysite nanocontainers of Example 4. A similar metal sheet is coated with a paint lacking silicate nanocontainers. The paint is allowed to dry and the coated sheets are scribed with an X through the paint down to the metal. The metal sheets are placed in a salt fog chamber (5% NaCl, 35° C.) for 200 hours. At the end of this period, the metal sheets are visually inspected for corrosion and peeling of the paint at the site of damage. The metal sheet coated with paint containing silicate nanocontainers will display less corrosion and peeling of the paint, when compared to the metal sheet coated with a paint lacking silicate nanocontainers.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A polymer coating comprising:
    a polymer blend comprising at least a first polymer and a second polymer; and
    at least one nanocontainer encapsulating at least one self-healing agent, wherein the at least one nanocontainer is a Janus particle comprising an oxide nanoparticle, a titania reservoir, a silicate particle coated with polyelectrolyte layers, a halloysite, a layered double hydroxide composite, a polyelectrolyte capsule, a poly(ureaformaldehyde), or a combination thereof, and comprising at least a first surface and a second surface, wherein the first surface interacts with the first polymer and the second surface interacts with the second polymer, and the at least one nanocontainer releases the at least one self-healing agent when the at least one nanocontainer contacts a corrosive surface or when exposed to a change in pH, and wherein the at least one self-healing agent is benzotriazole, 2-mercaptobenzothiazole, a silyl ester, an inorganic chromate, an inorganic nitrate, an organic nitrate, a polyaniline formaldehyde, 2,3-diphenyl benzoquinoxaline, mebendazole, an isoxazolidine, or a combination thereof; and
    wherein the at least one nanocontainer is at least partially mixed with the polymer blend, and wherein the polymer coating is a self-healing coating.

2. The polymer coating of claim 1, wherein the polymer blend comprises an alkyl methacrylate polymer, an allyl methacrylate polymer, a thioethyl methacrylate polymer, a vinyl methacrylate polymer, a vinyl benzene polymer, a 2-hydroxyethyl acrylate polymer, a butyl acrylate polymer, a 2-ethylhexyl acrylate polymer, a vinyltrimethoxysilane polymer, a vinyltriethoxysilane polymer, a vinyltoluene polymer, an α-methyl styrene polymer, a chlorostyrene polymer, a styrenesulfonic acid polymer, or a combination thereof.

3. The polymer coating of claim 1, further comprising a solvent, a pigment, a coalescing agent, a rheology modifier, a plasticizer, a surfactant, or any combination thereof.

4. The polymer coating of claim 1, wherein the coating is a decorative coating, an industrial coating, a protective coating, a self-cleaning coating, or any combination thereof.

5. A method of inhibiting corrosion of a substrate, the method comprising:
    applying a polymer coating on the substrate, wherein the polymer coating comprises a polymer blend comprising at least a first polymer and a second polymer; and
    at least one nanocontainer encapsulating at least one self-healing agent, wherein the at least one nanocontainer is a Janus particle comprising an oxide nanoparticle, a titania reservoir, a silicate particle coated with polyelectrolyte layers, a halloysite, a layered double hydroxide composite, a polyelectrolyte capsule, a poly(ureaformaldehyde), or a combination thereof, and comprising at least a first surface and a second surface, wherein the first surface interacts with the first polymer and the second surface interacts with the second polymer, and wherein the at least one self-healing agent is benzotriazole, 2-mercaptobenzothiazole, a silyl ester, an inorganic chromate, an inorganic nitrate, an organic nitrate, a polyaniline formaldehyde, 2,3-diphenyl benzoquinoxaline, mebendazole, an isoxazolidine, or a combination thereof; and
    wherein the at least one nanocontainer is at least partially mixed with the polymer blend.

6. The method of claim 5, wherein applying the polymer coating on the substrate comprises applying the polymer coating comprising the polymer blend comprising at least the first polymer and the second polymer, and the at least one nanocontainer, wherein the at least one nanocontainer releases the at least one self-healing agent when the at least one nanocontainer contacts a corrosive surface or when the at least one nanocontainer is exposed to a change in pH.

7. The method of claim 5, wherein the polymer coating composition is applied to the substrate by coating, brushing, dipping, spraying, rolling, or a combination thereof.

8. A method of preparing a self-healing coating, the method comprising:
    generating at least one Janus nanoparticle comprising an oxide nanoparticle, a titania reservoir, a silicate particle coated with polyelectrolyte layers, a halloysite, a layered double hydroxide composite, a polyelectrolyte capsule, a poly(ureaformaldehyde), or a combination thereof, and comprising at least a first surface and a second surface, wherein the first surface interacts with a first polymer and the second surface interacts with a second polymer, and containing at least one self-healing agent, wherein the at least one self-healing agent is benzotriazole, 2-mercaptobenzothiazole, a silyl ester, an inorganic chromate, an inorganic nitrate, an organic nitrate, a polyaniline formaldehyde, 2,3-diphenyl benzoquinoxaline, mebendazole, an isoxazolidine, or a combination thereof; and
    at least partially mixing the at least one Janus nanoparticle with a polymer blend comprising at least the first polymer and the second polymer.

9. The method of claim 8, wherein generating the at least one Janus nanoparticle comprises generating the at least one Janus nanoparticle that releases the at least one self-healing agent when the at least one Janus particle contacts a corrosive surface or when the at least one Janus particle is exposed to a change in pH.

10. A coated article comprising:
    an article;
    a self-healing coating on surface of the article, wherein the self-healing coating comprises a polymer blend comprising at least a first polymer and a second polymer; and
    at least one nanocontainer encapsulating at least one self-healing agent, wherein the at least one nanocontainer is a Janus particle comprising an oxide nanoparticle, a titania reservoir, a silicate particle coated with polyelectrolyte layers, a halloysite, a layered double hydroxide composite, a polyelectrolyte capsule, a poly(ureaformaldehyde), or a combination thereof, and comprising at least a first surface and a second surface, wherein the first surface interacts with the first polymer and the second surface interacts with the second polymer, and the at least one nanocontainer releases the at least one self-healing agent when the at least one nanocontainer contacts a corrosive surface or when exposed to a change in pH, and wherein the at least one self-healing agent is benzotriazole, 2-mercaptobenzothiazole, a silyl ester, an inorganic chromate, an inorganic nitrate, an organic nitrate, a polyaniline formaldehyde, 2,3-diphenyl benzoquinoxaline, mebendazole, an isoxazolidine, or a combination thereof; and wherein the at least one nanocontainer being at least partially mixed with the polymer blend.

11. The article of claim 10, wherein the at least one nanocontainer is a silicon dioxide particle coated with polyethyleneimine, polystyrene sulfonate, and benzotriazole.

12. The article of claim 10, wherein the polymer blend comprises polyethylene, polypropylene, polystyrene, polyvinylchloride, polyethylene terephthalate, polyethylene methacrylate, polymethyl methacrylate, or a combination thereof.

13. The article of claim 10, wherein the self-healing coating provides anti-corrosive property when coated on the article.

14. The polymer coating of claim 1, wherein the size of the at least one nanocontainer is about 0.1 nanometer to about 500 micrometers in diameter or length, and of any shape.

15. The polymer coating of claim 1, wherein the Janus particle is present at about 0.5 weight percent to about 10 weight percent of the polymer coating composition.

* * * * *